United States Patent
Hsu et al.

(10) Patent No.: US 10,034,202 B2
(45) Date of Patent: Jul. 24, 2018

(54) FINER CONTROL OF WLAN ASSOCIATION FOR NETWORK-CONTROLLED LTE-WLAN INTERNETWORKING

(71) Applicant: MEDIATEK INC., Hsinchu (TW)

(72) Inventors: Chia-Chun Hsu, New Taipei (TW); Pavan Santhana Krishna Nuggehalli, San Carlos, CA (US); Chie-Ming Chou, Taichung (TW)

(73) Assignee: MEDIATEK INC., HsinChu (TW)

( * ) Notice: Subject to any disclaimer, the term of this patent is extended or adjusted under 35 U.S.C. 154(b) by 36 days.

(21) Appl. No.: 15/154,041

(22) Filed: May 13, 2016

(65) Prior Publication Data

US 2016/0337904 A1 Nov. 17, 2016

Related U.S. Application Data

(60) Provisional application No. 62/162,249, filed on May 15, 2015.

(51) Int. Cl.
*H04W 28/18* (2009.01)
*H04W 28/24* (2009.01)
(Continued)

(52) U.S. Cl.
CPC ............ *H04W 28/18* (2013.01); *H04W 8/18* (2013.01); *H04W 8/205* (2013.01); *H04W 8/24* (2013.01);
(Continued)

(58) Field of Classification Search
CPC ... H04L 29/06537; H04L 51/06; H04L 69/24; H04L 65/1069; H04L 65/1066;
(Continued)

(56) References Cited

U.S. PATENT DOCUMENTS

| 2013/0089032 A1* | 4/2013 | Jung | H04W 48/16 370/328 |
| 2014/0161103 A1* | 6/2014 | Sirotkin | H04W 24/10 370/332 |

(Continued)

FOREIGN PATENT DOCUMENTS

| CN | 104349380 A | 2/2015 |
| WO | WO2014175882 A1 | 10/2014 |
| WO | WO2015013650 A1 | 1/2015 |

OTHER PUBLICATIONS

International Search Report and Written Opinion of International Search Authority for PCT/CN2016/082199 dated Aug. 11, 2016 (12 pages).

*Primary Examiner* — Ashley Shivers
(74) *Attorney, Agent, or Firm* — Imperium Patent Works; Helen Mao

(57) ABSTRACT

Apparatus and methods are provided for finer control for WLAN association. In one novel aspect, an enhanced NCWIK capability negotiation, an UE assistance information exchange, and an enhanced steering command are performed. In one embodiment, the enhanced NCIWK capacity negotiation includes additional UE information for fine selection. In another embodiment, the UE assistance information is sent to the eNB in addition to the measurement report. The UE assistance information is configured by the eNB. In yet another embodiment, the enhanced traffic steering command includes information of a target AP and one or more target channels. In one embodiment, the enhanced traffic steering command further includes channel direction information. In another novel aspect, the UE selects different UL and DL channels based on the received enhanced traffic steering command. In one embodiment, the UL and DL channels for the UE are different channels from the same AP or from different RATs.

20 Claims, 5 Drawing Sheets

(51) Int. Cl.
*H04W 24/10* (2009.01)
*H04W 88/02* (2009.01)
*H04W 8/24* (2009.01)
*H04W 28/12* (2009.01)
*H04W 28/02* (2009.01)
*H04W 8/18* (2009.01)
*H04W 8/20* (2009.01)
*H04W 48/14* (2009.01)
*H04W 36/22* (2009.01)
*H04W 88/06* (2009.01)

(52) U.S. Cl.
CPC ......... *H04W 24/10* (2013.01); *H04W 28/021* (2013.01); *H04W 28/0289* (2013.01); *H04W 28/12* (2013.01); *H04W 28/24* (2013.01); *H04W 48/14* (2013.01); *H04W 88/023* (2013.01); *H04W 36/22* (2013.01); *H04W 88/06* (2013.01)

(58) Field of Classification Search
CPC .......... H04L 67/14; H04W 8/22; H04W 8/24; H04W 8/245; H04W 8/02; H04W 8/18; H04W 8/205; H04W 8/183; H04W 8/26; H04W 88/023; H04W 28/16; H04W 28/18; H04W 28/24; H04W 24/10
See application file for complete search history.

(56) References Cited

U.S. PATENT DOCUMENTS

| | | | |
|---|---|---|---|
| 2014/0200008 A1* | 7/2014 | Wang | H04W 36/22 455/438 |
| 2015/0029955 A1 | 1/2015 | Heo et al. | 370/329 |
| 2015/0365869 A1* | 12/2015 | Gao | H04W 36/22 370/230 |
| 2016/0080958 A1 | 3/2016 | Rinne et al. | 370/338 |
| 2016/0234674 A1* | 8/2016 | Maguire | H04W 48/16 |
| 2016/0262078 A1 | 9/2016 | Yao et al. | |
| 2017/0195902 A1* | 7/2017 | Nigam | H04W 48/16 |

* cited by examiner

FINER CONTROL OF WLAN ASSOCIATION FOR NETWORK-CONTROLLED LTE-WLAN INTERNETWORKING

CROSS REFERENCE TO RELATED APPLICATIONS

This application claims priority under 35 U.S.C. § 119 from U.S. Provisional Application No. 62/162,249 entitled "Finer control of WLAN association for network-controlled LTE-WLAN internetworking" filed on May 15, 2015, the subject matter of which is incorporated herein by reference.

TECHNICAL FIELD

The disclosed embodiments relate generally to wireless communication, and, more particularly, to finer control for WLAN association using network-controlled LTE-WLAN internetworking (NCIWK).

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Internetworking between the LTE network and the unlicensed spectrum WLAN provides additional bandwidth to the operators.

However, current approaches suffer from various limitations that hamper the benefits of LTE-WLAN interworking. For example, core network approaches like ANDSF provide rich support for implementing operator policy, providing subscriber specific service, and enabling different kinds of WLAN deployment (e.g., trusted and non-trusted WLANs). However, core network approaches suffer from significant performance shortcomings. These approaches are unable to react to dynamically varying radio conditions and do not permit aggregation of IP flows over LTE and WLAN access. These limitations have been resolved by the Release 12 feature on RAN assisted 3GPP/WLAN interworking. However, R12-IWK only considers UE centric method, which does not have enough network control and access network utilization. For example, the RAN cannot control which UE/UEs to offload traffic to WLAN. The traffic-heavy UE may not be able to move from a heavy-loaded network to a light-loaded network due to the UE-centric instinct, and vice versa. There could still be massive-toggling and ping-pong problems. As a result, Release 13 will standardize the network centric solution (i.e. NCIWK) to let RAN dynamically and efficiently control traffic steering between RAN and WLAN for UEs in both connected mode and idle mode to improve user experience and system efficiency. In addition, due to the contentions on unlicensed spectrum resources, WLAN transmission efficiency was not good and steering UEs to WLAN only based on UE's PHY layer measurements (e.g. beacon RSSU measurement) may fail to get satisfied data rate. In this disclosure, we consider eNB can provide a finer control of WLAN association for the steering UEs in order to improve the transmission efficiency and increase data rate.

Improvements and enhancements are required for finer control of WLAN association for the steering UEs in order to improve the transmission efficiency and increase data.

SUMMARY

Apparatus and methods are provided finer control for WLAN association under NCWIK. In one novel aspect, an enhanced NCWIK capability negotiation, an UE assistance information exchange, and an enhanced steering command are performed. In one embodiment, the enhanced NCIWK capability negotiation includes reporting at least one capability information comprising: a supported Wi-Fi version, a Wi-Fi modem MAC address, a Wi-Fi modem IP address, a clear channel assessment (CCA) capability and sensitivity, an antenna capability, a MAC buffer size at Wi-Fi modem, a number of simultaneous AP association, whether LTE-WLAN aggregation(LWA) is supported, whether License-Assisted Access (LAA) is supported, and a power budget of simultaneous operation on an LTE modem and a Wi-Fi modem. In another embodiment, the UE assistance information for NCIWK includes at least one UE information comprising: a UE power preference indication, an on-going Wi-Fi flow indication, an AP status information, an in-device coexistence (IDC) problem indication, an AP channel blacklist, a traffic steering direction preference indication, an UE speed information, and a CSMA/CA statistics. In yet another embodiment, the enhanced traffic steering command comprising information of a target AP and one or more target channels. In one embodiment, the enhanced traffic steering command further includes channel direction information, where each target channels is identified by one channel identification comprising: a channel ID, and a frequency of the target WLAN channel.

In another novel aspect, the UE selects different UL and DL channels based on the received enhanced traffic steering command. In one embodiment, the UL and DL channels for the UE are different channels from the same AP. In another embodiment, the UL and DL channels for the UE are different channels from different RATs, such as one from the WLAN AP and one from the LTE eNB.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
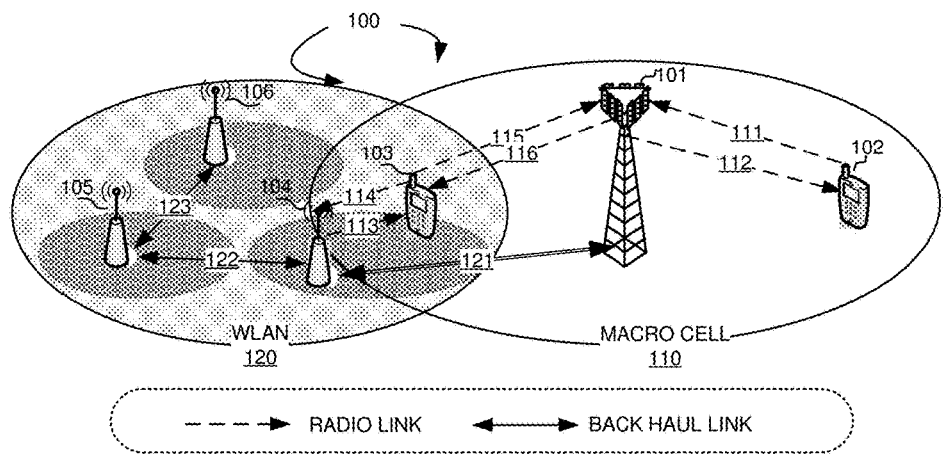
FIG. 1 illustrates a system diagram of a wireless network with LWA in accordance with embodiments of the current invention.
Figure 1:
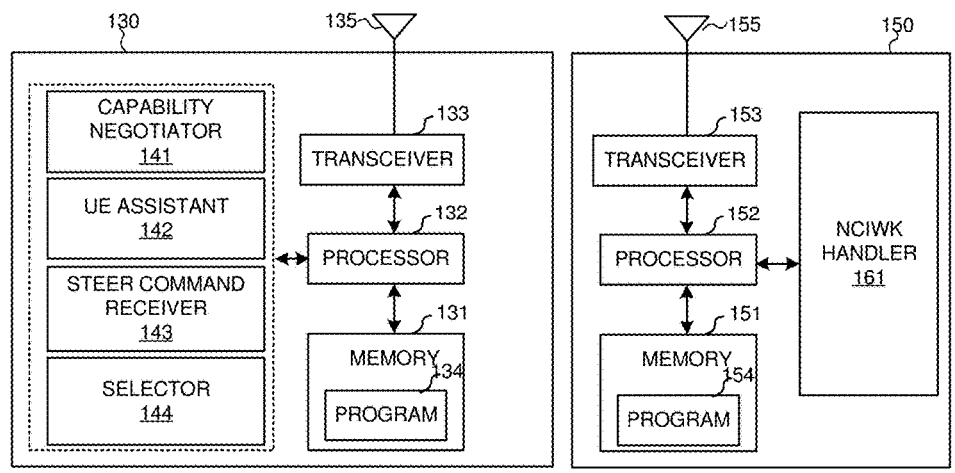

FIG. 1 illustrates a system diagram of a wireless network 100 with the LWA in accordance with embodiments of the current invention. Wireless network 100 comprises a main base station eNB, also referred as a macro eNB 101, UEs with dual connectivity 102, 103, and small cell eNBs 104, 105 and 106. Wireless network 100 supports multiple component carriers over different frequency channels, dual connectivity, and carrier aggregation for serving cells originated from different eNBs. A UE 102 is served by eNB 101 with an uplink 111 and down link 112. UE 102 is served by Macro Cell 110 only because eNB 101 is the only base station in range. UE 103, however, is in the range with eNB 101 and eNB 104. When UE 103 is configured with dual connectivity, UE 103 is served by eNB 101 with uplink 115 and downlink 116. At the same time, UE 103 is also served by eNB 104 with uplink 113 and downlink 114. Wireless system 100 is configured with a Macro Cell 110, which includes the macro eNB 101 and WLAN 120, which includes WLAN APs 104, 105 and 106. Wireless network 100 can be an inter-RAT CA network, with the anchor eNB 101 employs one technology, for example LTE or other cellular standards, while base stations 104, 105 and 106 using different wireless standards, such as Wifi. Regardless of the inter-BS CA using the same standard or different standard, UE 103 is configured to be LWA-enabled and can perform data aggregation between its anchor eNB 101 and WLAN AP 104, which is in the range of UE 103.

In one exemplary configuration, initially, UE 103 camps on the macro cell served by eNB 101. UE 101 establishes Radio Resource Control (RRC) connection with the Radio Access Network (RAN). eNB 101 provides and controls the initial RRC connection and provides NAS mobility information and security input. eNB 101 is the anchor eNB for UE 103. UE 101 subsequently moves within the coverage area of anchor eNB 101 while moving into the coverage area of WLAN 120. Upon entering WLAN 120's coverage area, UE 101 can select a WLAN AP to aggregate or offload its data traffic if needed. In such situation, UE 101 can use additional resources from WLAN AP 103.

In one exemplary configuration, backhaul connection 121 connects macro cell eNB 101 with WLAN AP 104 through Xn interface, for example, Xw or X2 interface. The coordination between anchor eNB 101 and WLAN AP 104 can be performed through Xn interface, for example, Xw or X2 interface. The Xn interfaces, also known as backhaul connections provide communication and coordination between eNBs and WLAN APs. Similarly, backhaul connection 122 within the WLAN 120 connects WLAN APs 104 and 105 through Xn interface.

FIG. 1 further illustrates simplified block diagrams 130 and 150 for UE 103 and eNB 101, respectively. Mobile station 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in mobile station 103. Memory 131 stores program instructions and data 134 to control the operations of mobile station 103.

Mobile station 103 also includes multiple function modules that carry out different tasks in accordance with embodiments of the current invention. A capability negotiator 141 performs an enhanced network-controlled internetworking (NCIWK) capability negotiation. An UE assistant 142 sends UE assistance information for NCIWK upon detecting one or more triggering event, wherein the assistance information is configured by the network and is sent following a measurement report to the eNB. A steering command receiver 143 receives an enhanced traffic steering command from the eNB, wherein the enhanced traffic steering command includes detailed WLAN association information. A selector 144 selects and associates a WLAN AP based on the steering command.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101.

eNB 101 also includes multiple function modules that carry out different tasks in accordance with embodiments of the current invention. For example, a NCIWK handler 161 handles functional procedure and communicates with the UEs and the WLAN APs for NCIWK related functions.

Figure 2:
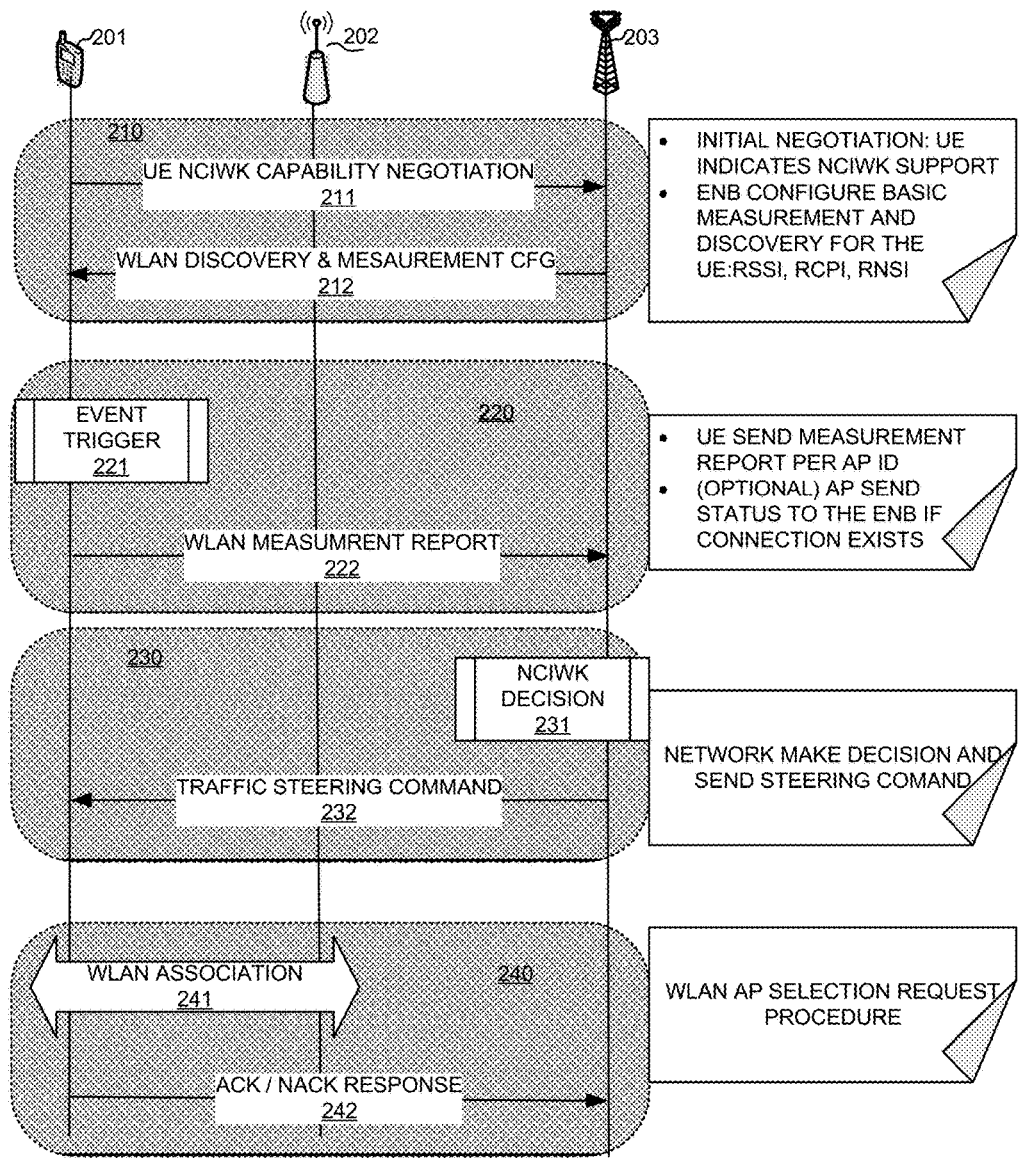
FIG. 2 shows an exemplary procedural diagram of network-centric internetworking message flow that facilitates the WLAN AP selection.

FIG. 2 shows an exemplary procedural diagram of network-centric internetworking message flow that facilitates the WLAN AP selection. A UE 201 is connected with an eNB 203 in a wireless network. One or more WLAN APs overlap the coverage area of eNB 203, such a WLAN AP 202. At stage 210, UE 201 and eNB 203 exchanges capability information. At step 211, UE 201 sends UE NCIWK capability negotiation message to eNB 203. At step 212, eNB 203 configures WLAN discovery and measurement to let UE get sufficient radio condition with regarding to candidate WLAN APs, e.g., RSSI/RCPI/RSNI value for respective APs. At stage 220, UE 201 monitors and sends measurement reports to eNB 203. At step 221, UE 201 detects triggering event for measurement report sending. At step 222, UE 202 sends measurement reports with corresponding AP ID, such as SSID, BSSID, and HESSID, to eNB 203. Alternatively, the AP can send reports to the eNB directly if such an interface exists. Alternatively, the AP might exchange the associating UEs' channel condition, such as the supported MCS by STA's feedback, with the eNB directly. At stage 230, the UE receives steering command from the eNB. At step 231, eNB 203 makes NCIWK steering decision based on the received UE information. If the eNB decides one of UE's PDN flow could be offloaded to a selected AP, the eNB will proceed with a traffic steering command to the UE. At step 232, eNB 203 sends traffic steering command to UE 201. At stage 240, the UE selects and associates with a WLAN AP based on the steering command. At step 241, UE 201 tries to associate with AP

202. At step 242, UE 201 sends ACK/NACK to the eNB 203 based on the association result. With the procedural above, the UE can select and associate with a WLAN AP based on the network decision.

WLAN transmission efficiency may be degraded as excessive contentions occur and steering UEs may get poor data rate regardless of good radio condition at WLAN AP. Meanwhile, the inefficient utilization also leads to inefficient UE power consumption that UE needs to consume its power on waiting or monitoring unnecessary management frame. Under NCIWK, eNB as a centric-controller is responsible to guarantee UE QoS. To prevent inefficient radio utilization, a possible mechanism is to enhance the steering behavior as a finer control of WLAN association whereby the steering decision does not only rely on measurement results but also considering AP and UE's additional information. Moreover, the eNB can further request AP to serve steering UEs with specific handling or command different UEs to make different kinds of WLAN association. FIG. 3 through FIG. 6 shows enhancement of the NCIWK procedural for each stage.

Figure 3:
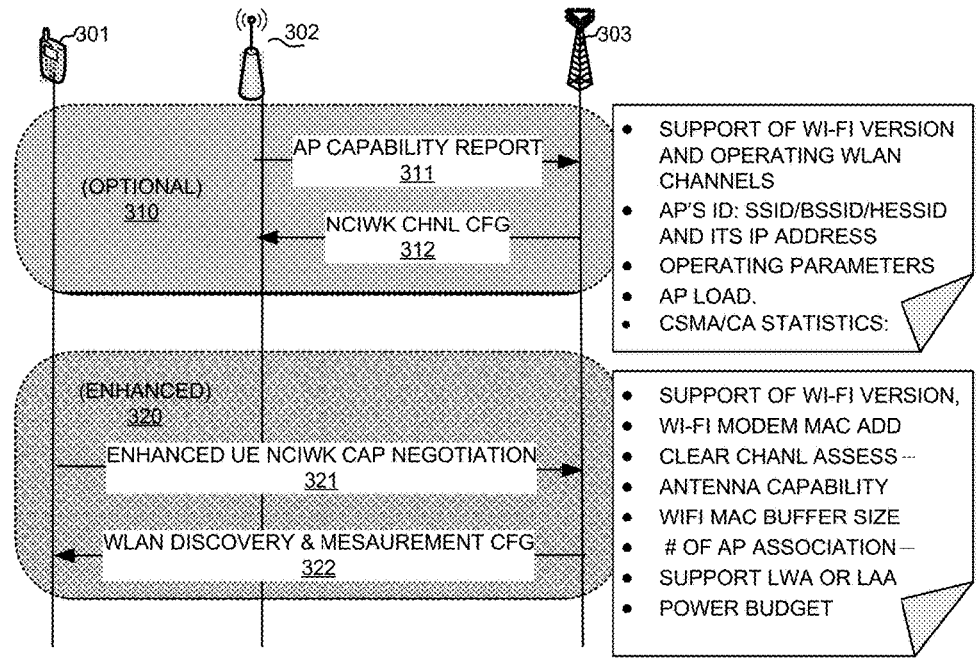
FIG. 3 is an exemplary diagram for an enhanced NCIWK capability negotiation in accordance to embodiments of the current invention.

FIG. 3 is an exemplary diagram for an enhanced NCIWK capability negotiation in accordance to embodiments of the current invention. A UE 301 is connected with an eNB 303 in a wireless network. One or more WLAN APs overlap the coverage area of eNB 303, such a WLAN AP 302. An optional procedural 310 is introduced for the capability negotiation stage. At step 311, AP 302 sends AP capability report to eNB 303. AP capability report helps eNB 303 to make better decision of the steering selection. AP may forward its operation information to eNB for facilitate steering decision. The operation information may include: Support of Wi-Fi version and operating WLAN channels; AP's ID such as SSID/BSSID/HESSID and its IP address, Operating parameters setting, such as MPDU size, Max PPDU duration, TXOP, the support of RTS/CTS, Antenna configuration, EDCA parameter set and etc.; AP load such as how many STAs are associated to the AP and the percentage of time the medium was busy for each WLAN channel; and CSMA/CA statistics. The CSMA/CA statistics is used to show the contention situation during AP's transmission. The AP may report respective CSMA/CA statistics for its operating WLAN channels. The possible implementation of CSMA/CA statistics includes the number of passing the CCA threshold over a period; the average back-off waiting time; and the RTS/CTS failure rate.

After receiving the operation information, the eNB may request AP to make specific partitioning on its WLAN channels usage to improve regarding efficiency. At step 312, eNB 303 replies with a NCIWK channel configuration message. For example, eNB 303 may request IEEE802.11ac capable AP to serve IEEE802.11ac capable STAs at a specific WLAN channel (e.g. channel 183) other from legacy STAs. When receiving the request, the AP may either reply an acknowledge message or reject message to inform the eNB the decision. Another example is eNB may request AP to stop serving STA with particular Wi-Fi version (e.g. IEEE802.11b) to improve transmission efficiency and the eNB will also not steer corresponding UEs to the WLAN AP. Another example is the eNB can suggest AP to turn its operating parameters (e.g. EDCA setting) based on corresponding channel partitioning. As a result, once accomplishing AP capability report and NCIWK channel configuration, the eNB could know AP's status and further to schedule the WLAN channels' usage to facilitate later steering decisions. Part of AP operation information is variable, such as the AP load. The AP could indicate the changes to the eNB if needed.

Figure 4:
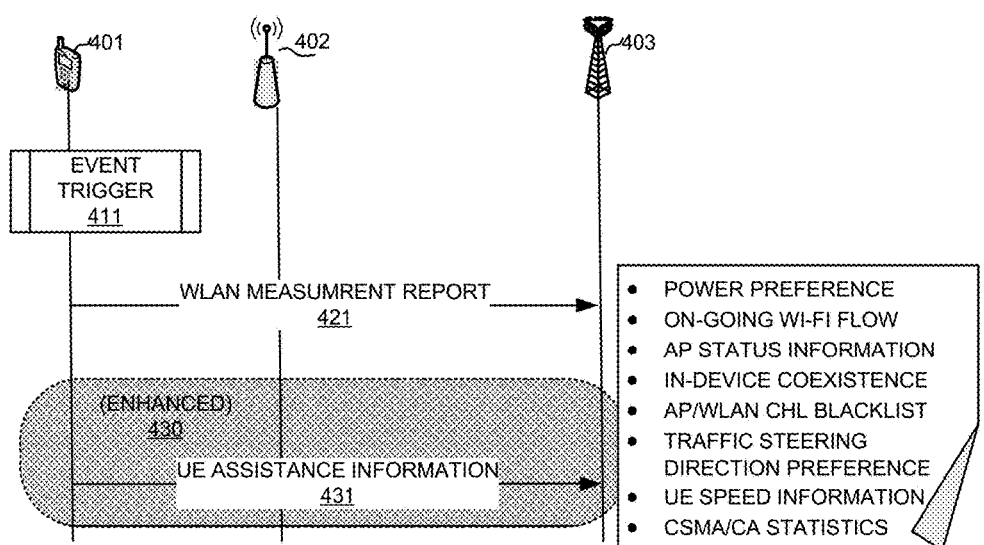
FIG. 4 is an exemplary diagram for an UE assistance message in accordance to embodiments of the current invention.

FIG. 3 further shows an enhanced UE NCKIWK capability negotiation procedural 320. At step 321, UE 301 sends enhanced UE NCIWK capability negotiation message to eNB 303. In this procedure, except indicating the support of NCIWK, the UE will further report its Wi-Fi modem capability information to the eNB. The capability information may comprise: the support of Wi-Fi version, e.g. IEEE 802.11/a/b/g/n/ac; the Wi-Fi modem MAC address or IP address; the Clear Channel Assessment (CCA) capability and sensitivity, e.g. the capability to support CCA-ED/CCA-CS on primary and secondary WLAN channel; the antenna capability, e.g. able to supporting dual-band operation on 2.4 GHz/5 GHz or not; the MAC buffer size at Wi-Fi modem; the number of simultaneous AP association, e.g. it is possible one UE cable of two Wi-Fi modems and to have different AP associations; the ability to support LTE-WLAN Aggregation (LWA) or License-Assisted Access (LAA); and the power budget of simultaneous operations on LTE modem and Wi-Fi modem. Based on the abovementioned information, the eNB can decide whether to perform WLAN discovery and measurement configuration accordingly. For instance, when UE indicates its Wi-Fi version is IEEE802.11b, the eNB may abandon the WLAN steering opportunity since LTE system can always provide higher data rate for such UE. Hence, there is no need to perform corresponding WLAN measurement and could save UE power consumption. Moreover, while WLAN discovery and measurement is required, the eNB could properly configure the measurement objects (i.e. which frequency band and associating bandwidth) and measurement gap to prevent unnecessary or blind measurement. If eNB 303 determines that UE needs to perform WLAN discovery and measurement, it moves step 322 and sends the WLAN discovery and measurement configuration message to UE 301. FIG. 4 is an exemplary diagram for an UE assistance message in accordance to embodiments of the current invention. A UE 401 is connected with an eNB 403 in a wireless network. One or more WLAN APs overlap the coverage area of eNB 403, such a WLAN AP 402. At step 411, UE 401 monitors and detects measurement report triggers. At step 421, UE 401 sends WLAN measurement report to eNB 403 without additional assistance information. An enhanced stage 430 is introduced. At step 431, UE 401 sends UE assistance information for NCIWK. In one embodiment, the UE assistance information for NCIWK is sent based on a request from the eNB. In addition to measurement reporting, the eNB can request UE to send assistance information, thus eNB is able to make the traffic steering decision based on UE's feedback. The assistance information may comprise the power preference indication, such as the UE's preference of low power consumption. Based on the low power consumption preference the eNB may aggressively steer the UE to WLAN rather than other UEs with normal power consumption preference because the lower power consumption by using the Wi-Fi transmission. The assistance information may also comprise the on-going Wi-Fi flow indication. It is possible that UE employs UE centric mechanism to initiate Wi-Fi transmission before NCIWK. By indicating the information, it is helpful for eNB to decide whether to change/cancel the normal Wi-Fi flow. Further, the assistance information may comprise the AP status information. The UE may forward candidate AP's beacon information element (e.g. BSS load) to the eNB. The eNB may configure UE not to report such information if the CP interface between AP and eNB was existed. The assistance information may further comprise the In-Device Coexistence (IDC) problem indication. According to UE's RF capability, the transmission on some WLAN channels may cause interference to LTE network. The UE may report the potential risk to eNB and the eNB could prevent steering UE to associate with relating WLAN channels. The assistance information may comprise an AP/WLAN channel blacklist. For some reasons, the UE may not tend to associate with some specific AP/WLAN channel and the UE can exchange the blacklist (by listing AP/WLAN channel ID list) with eNB. The assistance information may comprise the traffic steering direction preference indication indicating whether DL, UL or both is preferred for WLAN transmission. The assistance information may comprise the UE speed information. It is more likely eNB requests low speed UE to perform WLAN traffic steering. Even though eNB may have UE speed information during RRC connection establishment, it is still possible UE changes its speed without crossing serving eNB's coverage and the instant speed information may be useful for steering decision. Further, the assistance information may comprise CSMA/CA statistics. The UE may perform CCA to understand its congestion level at unlicensed spectrum and the information is helpful to let eNB expect UL throughput performance while steering UL traffic to WLAN.

In some embodiments, not all assistance information is required. The eNB can configure the reporting object based on its implementation. Moreover, instead of signaling the respective assistance information, the eNB may configure the UE to considering the overall condition and use a unified WLAN preference indicator (e.g. a value, 0~9) to show its preference on WLAN traffic steering. For example, UE #1 and UE #2 indicate their WLAN traffic steering preferences are nine and three, respectively. The eNB may perform WLAN traffic steering for UE #1 even though UE #2 has better WLAN RSRP value. Further, the UE may use different WLAN preference indicator for different APs. The UE may send another UE assistance information if some information/situation has changed. However, to avoid excessive reporting, it may have a prohibition timer that the UE is not allowed to send the assistance information until the timer is expiring (the timer will start when sending the UE assistance information). Alternatively, when UE does not indicate the assistance information, the UE may also reject the later traffic steering command for some reason from its upper layer (e.g. NAS).

Figure 5:
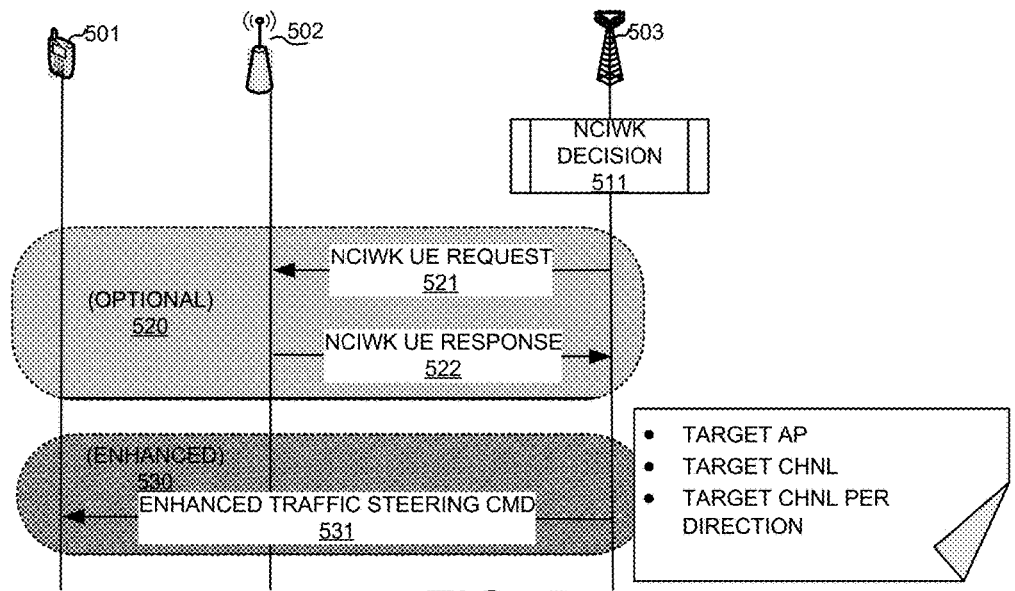
FIG. 5 is an exemplary diagram for an enhanced traffic steering command in accordance to embodiments of the current invention.

FIG. 5 is an exemplary diagram for an enhanced traffic steering command in accordance to embodiments of the current invention. A UE 501 is connected with an eNB 503 in a wireless network. One or more WLAN APs overlap the coverage area of eNB 503, such a WLAN AP 502. At step 511, eNB 503 makes NCIWK steering decision. If there is CP interface between the AP and the eNB, the eNB may command AP to serve the steering UEs with different priorities or resources after making traffic steering decisions. At step 521, eNB 503 sends NCIWK UE request to AP 502. With such request, the WLAN AP efficiency can be improved due to the coordination assistance from eNB. For instance, the AP schedules its associating UEs by round-robin strategy (e.g. each STA has equal priority) originally. Based on steering decisions, the eNB may request AP to serve particular steering UEs (e.g. with good WLAN RSRP performance) with higher priority (e.g. by using longer TXOP). The request can be accomplished by sending a NCIWK UE request message, which contains the UE's MAC address. At step 522, AP 502 sends NCIWK UE response to eNB 503. The AP may either reply an acknowledge message or a rejection message to inform the eNB.

At this stage, as further shown in FIG. 5, eNB 503 sends an enhanced NCIWK steering command to UE 501 at step 531. The eNB will not only command the UE to steering its traffic to a specific AP but also give the targeted WLAN channel (e.g. by indicating channel ID or frequency). Furthermore, the eNB may command the respective channels for separate traffic direction (e.g. DL traffic is steering to WLAN channel #N and UL traffic is steering to WLAN channel #M). Followed by the command, the UE will try to associate with the WLAN AP through its primary channel and thereafter transmit/receive data at commanded channels. As a result, the UE does not need to monitor all WLAN channels and saves its power consumption. The finer association can improve the WLAN transmission efficiency to increase the overall NCIWK performance. In one embodiment, for different PDN flow, the eNB may also give different traffic steering command that different bearer may associate with different WLAN channels to meet their QoS.

In one embodiment, the eNB may send traffic steering command with configuring a WLAN channel index for selecting AP. Afterwards, the eNB can use a MAC CE to activate/deactivate the association of WLAN channels based on UE assistance information and WLAN measurement report dynamically (the default association of WLAN channel is activated when receiving traffic steering command). It is possible to introduce a deactivate timer for respective WLAN channel and the UE could deactivate the association until the timer expires without receiving any data transmission.

In another embodiment, the eNB can use broadcasted message, e.g. system information to indicate the flavor of NCIWK channel usage. Under this example, the eNB will indicate the AP ID with corresponding channel list in specified flavor orders (e.g. channel 1/2/4/3 for 11b/11g/11n/11ac Wi-Fi version UE). For the steering UEs, they will periodically check the system information to follow the proper association. The indications are changing followed by modification period and the UE can trace SIB tag to identify the needs of SIB update.

In one embodiment, the eNB may exchange the information relating to the finer control of WLAN association with target eNB while handover (HO) is initiating. The UE may continue applying the command (e.g. associate with particular WLAN channel while the associating AP's radio conditions satisfies the specified RAN rules) even when the UE going into RRC_IDLE state (LTE modem is powering off but Wi-Fi modem is still powering on). In another embodiment, the eNB may use SIB to indicate the various flavors for different 802.11 channels. Afterwards, the idle UE can acquire the SIB to understand which channel association is better for its usage and the eNB may update the flavor of association followed by modification period. The UE may employ ANDSF rules or RAN rules to decide when/which AP to perform WLAN traffic steering and consequently apply the SIB information to decide the proper channel association with regarding to the AP.

Figure 6:
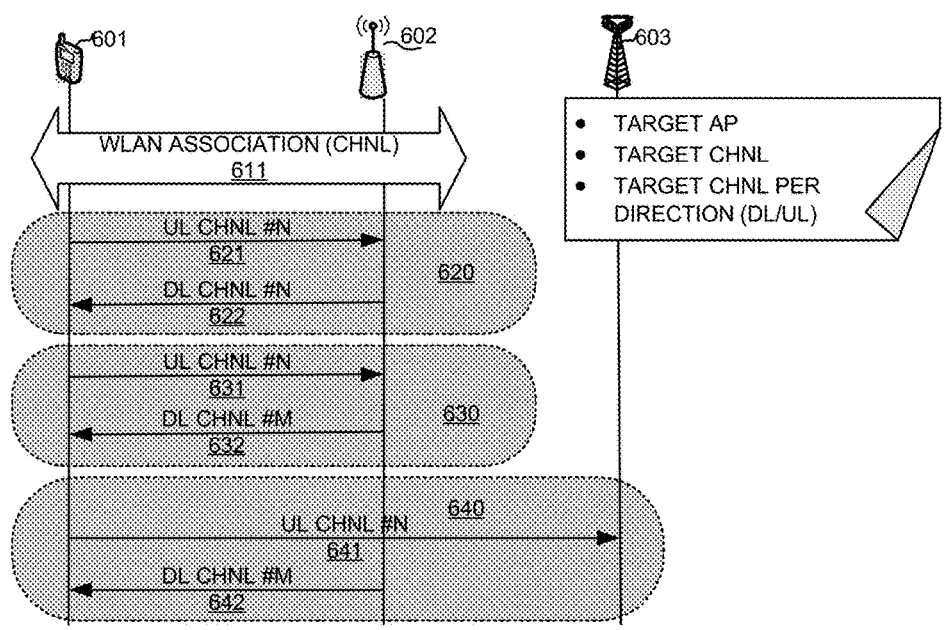
FIG. 6 is an exemplary diagram for an UE channel selection based on the enhanced steering command in accordance to embodiments of the current invention.

FIG. 6 is an exemplary diagram for an UE channel selection based on the enhanced steering command in accordance to embodiments of the current invention. A UE 601 is connected with an eNB 603 in a wireless network. One or more WLAN APs overlap the coverage area of eNB 603, such a WLAN AP 602. At step 611, UE 601 tries to associate with AP 602 based on the received steering command. At option 620, UE 601 may have the same channel for UL and DL. At step 621, UE 601 uses channel #N as UL channel. At step 622, UE 601 uses the same channel #N as DL channel. At option 630, UE 601 may have different channel for UL and DL but both with the same AP. At step 631, UE 601 uses channel #N of AP 602 as UL channel. At step 632, UE 601 uses a different channel #M of AP 602 as DL channel. At option 640, UE 601 may have different channel for UL and DL, which are from different RAT. At step 641, UE 601 uses channel #N of eNB 603 as UL channel. At step 642, UE 601 uses channel #M of AP 602 as DL channel. In another embodiment, the eNB may direct the UE to use WLAN for some or all downlink traffic, and LTE for some or all uplink traffic. Alternately, the eNB may direct the UE to use WLAN for some or all uplink traffic, and LTE for some or all downlink traffic.

Figure 7:
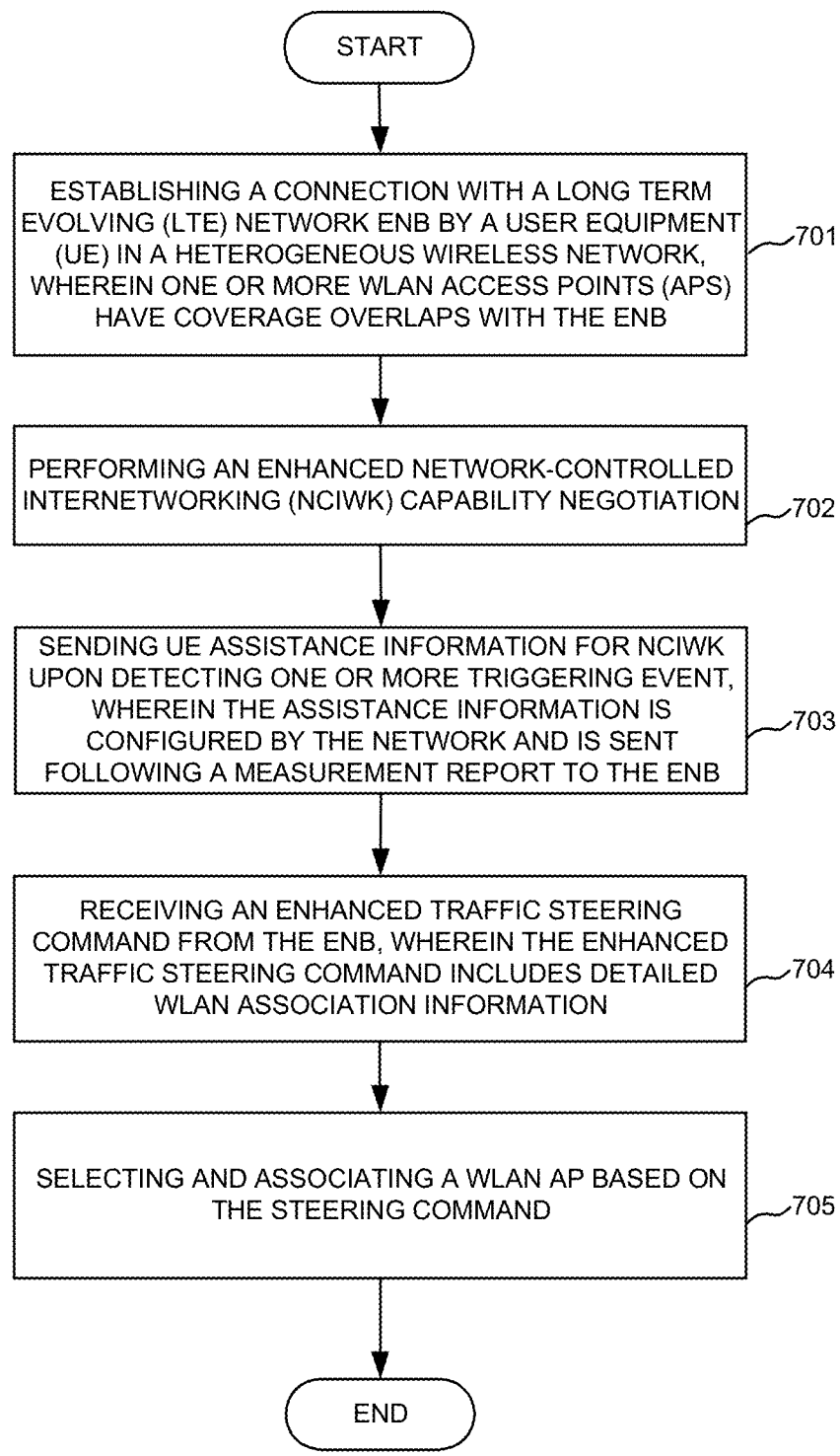
FIG. 7 shows an exemplary flow chart for the enhanced NCIWK in accordance with embodiments of the current invention.

FIG. 7 shows an exemplary flow chart for the enhanced NCIWK in accordance with embodiments of the current invention. At step 701, the UE establishes a connection with a long term evolving (LTE) network eNB in a heterogeneous wireless network, wherein one or more WLAN access points (APs) have coverage overlaps with the eNB. At step 702, the UE performs an enhanced network-controlled internetworking (NCIWK) capability negotiation. At step 703, the UE sends UE assistance information for NCIWK upon detecting one or more triggering event, wherein the assistance information is configured by the network and is sent following a measurement report to the eNB. At step 704, receives an enhanced traffic steering command from the eNB, wherein the enhanced traffic steering command includes detailed WLAN association information. At step 705, the UE selects and associates a WLAN AP based on the steering command.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a connection with a long term evolving (LTE) network eNB by a user equipment (UE) in a heterogeneous wireless network, wherein one or more WLAN access points (APs) have coverage overlaps with the eNB;
   performing an enhanced network-controlled internetworking (NCIWK) capability negotiation, wherein the UE reports it capability information to the eNB to assist the eNB for measurement configurations and traffic steering decisions for the UE;
   sending UE assistance information for NCIWK upon detecting one or more triggering event, wherein the assistance information is configured by the network and is sent following a measurement report to the eNB;
   receiving an enhanced traffic steering command from the eNB, wherein the enhanced traffic steering command includes detailed WLAN association information; and
   selecting and associating a WLAN AP based on the steering command.

2. The method of claim 1, wherein the enhanced NCIWK capability negotiation includes reporting at least one capability information comprising: a supported Wi-Fi version, a Wi-Fi modem MAC address, a Wi-Fi modem IP address, a clear channel assessment (CCA) capability and sensitivity, an antenna capability, a MAC buffer size at Wi-Fi modem, a number of simultaneous AP association, whether LTE-WLAN aggregation (LWA) is supported, whether License-Assisted Access (LAA) is supported, and a power budget of simultaneous operation on an LTE modem and a Wi-Fi modem.

3. The method of claim 1, wherein the UE assistance information for NCIWK includes at least one UE information comprising: a UE power preference indication, an on-going Wi-Fi flow indication, an AP status information, an in-device coexistence (IDC) problem indication, an AP channel blacklist, a traffic steering direction preference indication, an UE speed information, and a CSMA/CA statistics.

4. The method of claim 1, further comprising: receiving a WLAN discovery and measurement configuration information from the eNB, wherein the configuration information is based on the enhanced UE NCIWK capability negotiation.

5. The method of claim 4, wherein the configuration information is further based on one or more AP capability report sent from the one or more APs to the eNB.

6. The method of claim 5, wherein the AP capability report comprising at least one AP capability element comprising: a supported Wi-Fi version, operating WLAN channels, an identification of AP, AP operating parameters, an AP load, and an AP CSMA/CA statistics.

7. The method of claim 1, wherein the enhanced traffic steering command comprising information of a target AP and one or more target channels.

8. The method of claim 7, wherein each target channels is identified by one channel identification comprising: a channel ID, and a frequency of the target WLAN channel.

9. The method of claim 7, wherein the enhanced steering command further comprising: a traffic direction for each target channel, wherein the traffic direction is either a uplink (UL) or downlink (DL).

10. The method of claim 9, wherein a UL target channel is different from a DL target channel.

11. The method of claim 1, wherein the enhanced traffic steering command is indicated in a SIB.

12. The method of claim 1, wherein the enhanced traffic steering command is broadcasted in a system information message.

13. An user equipment (UE), comprising:
   a radio frequency (RF) transceiver that transmits and receives radio signals with a long term evolving (LTE) network eNB in a heterogeneous wireless network, wherein one or more WLAN access points (APs) have coverage overlaps with the eNB;
   a capability negotiator that performs an enhanced network-controlled internetworking (NCIWK) capability negotiation, wherein the UE reports it capability information to the eNB to assist the eNB for measurement configurations and traffic steering decisions for the UE;
   an UE assistant that sends UE assistance information for NCIWK upon detecting one or more triggering event, wherein the assistance information is configured by the network and is sent following a measurement report to the eNB;
   a steering command receiver that receives an enhanced traffic steering command from the eNB, wherein the enhanced traffic steering command includes detailed WLAN association information; and
   a selector that selects and associates a WLAN AP based on the steering command.

14. The UE of claim 13, wherein the enhanced NCIWK capability negotiation includes reporting at least one capability information comprising: a supported Wi-Fi version, a Wi-Fi modem MAC address, a Wi-Fi modem IP address, a clear channel assessment (CCA) capability and sensitivity, an antenna capability, a MAC buffer size at Wi-Fi modem, a number of simultaneous AP association, whether LTE-WLAN aggregation (LWA) is supported, whether License-Assisted Access (LAA) is supported, and a power budget of simultaneous operation on an LTE modem and a Wi-Fi modem.

15. The UE of claim 13, wherein the UE assistance information for NCIWK includes at least one UE information comprising: a UE power preference indication, an on-going Wi-Fi flow indication, an AP status information, an in-device coexistence (IDC) problem indication, an AP channel blacklist, a traffic steering direction preference indication, an UE speed information, and a CSMA/CA statistics.

16. The UE of claim 13, wherein the enhanced traffic steering command comprising information of a target AP and one or more target channels.

17. The UE of claim 16, wherein the enhanced steering command further comprising: a traffic direction for each target channel, wherein the traffic direction is either a uplink (UL) or downlink (DL).

18. The UE of claim 17, wherein a UL target channel is different from a DL target channel.

19. The UE of claim 13, wherein the enhanced traffic steering command is indicated in a SIB.

20. The UE of claim 13, wherein the enhanced traffic steering command is broadcasted in a system information message.

* * * * *